Figure 1:
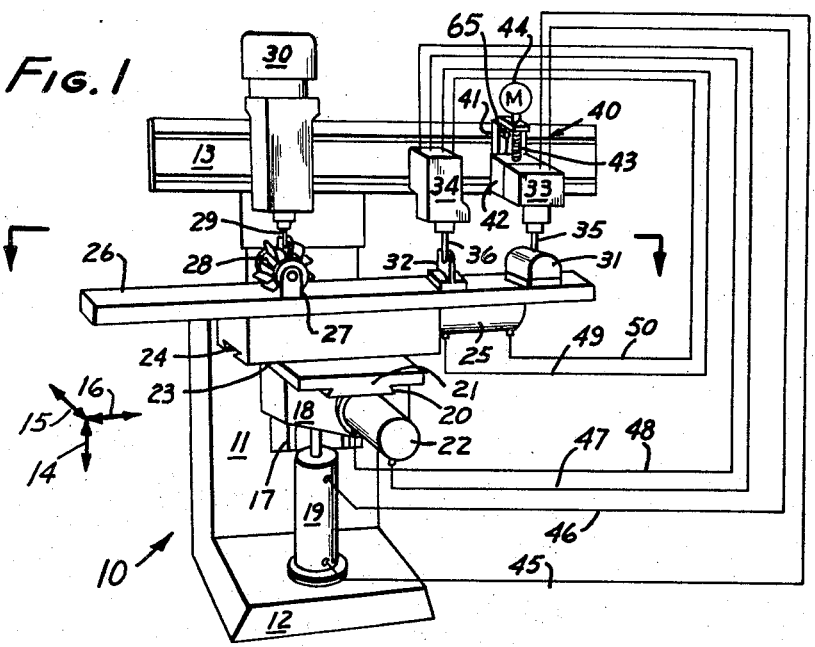

Sept. 12, 1967 P. J. WEAVER 3,340,772
TRACER-CONTROLLED MACHINE TOOL WITH PLURALITY OF TRACERS
Filed April 4, 1966

INVENTOR.
PAUL J. WEAVER
BY
*Angus & Mow*
ATTORNEYS.

United States Patent Office 3,340,772
Patented Sept. 12, 1967

3,340,772
TRACER-CONTROLLED MACHINE TOOL
WITH PLURALITY OF TRACERS
Paul J. Weaver, Pasadena, Calif., assignor to True-Trace
Corporation, El Monte, Calif., a corporation of Connecticut
Filed Apr. 4, 1966, Ser. No. 539,776
8 Claims. (Cl. 90—13)

This invention relates to tracer valve controlled machine tools. Tracer valve controlled machine tools are characterized by the arrangement that all or some of the relative motions between a workpiece and a cutting tool are generated by the reaction between a template (sometimes called a "pattern") and the stylus of a tracer valve. The control is such that the workpiece and a cutter describe the same relative path in space as the stylus and the template. In this way, the shape of a template is reproduced in the workpiece.

Tracer valves and the machine tools they control are broadly known from U.S. Patents Nos. 2,753,145 and 2,835,466. In addition, tracer valves which automatically traverse around a closed path are known from U.S. Patent No. 2,909,357. These patents relate to manual control in three-axis motion, or to automatic or manual control in two-axis motion. They do not show automatic control in three-axis motion. Automatic tracing in three axes involves numerous complications which have rendered the above referenced devices impractical for this purpose. This is a misfortune because these devices have been developed to a high degree of accuracy and reliability. It is an object of this invention to provide automatic three-axis control for a machine tool such as a mill, utilizing a plurality of conventional tracer valves for the control.

A tracer valve controlled machine tool according to this invention includes a frame having first, second and third axes which are mutually, obliquely oriented. First, second and third sets of slides and slideways are supported by the frame so that each slide is reciprocable along a respective axis relative to the frame. At least one of said sets is mounted to another one of said sets whereby to be movable along two of said axes.

First, second and third motive means are adapted to move the first, second and third slides along their respective axes, one of said slides supporting another slide. A worktable is supported by this last-mentioned slide, which worktable is adapted to hold a workpiece and a first and a second template. A cutter spindle and a first and a second tracer valve are provided. The first axis, the cutter spindle, and the axis of control of the first tracer valve are parallel to each other, the second tracer valve controlling motion along the second and third axes, the cutter spindle and the tracer valves being mounted to the machine tool so that three-dimensional motion is possible between them and the worktable. Drive means is provided for moving said first tracer valve parallel to said first axis. Accordingly, the tool may cut a single three-dimensional workpiece as a function of the shape of a pair of templates.

According to a preferred but optional feature of the invention, the drive means for the first tracer valve comprises a tracer slideway extending along the first axis and mounted to the frame, a tracer mount slidably mounted to the slide to which first tracer valve is mounted, and motive means for driving the tracer mount along the tracer slideway.

Figure 2:
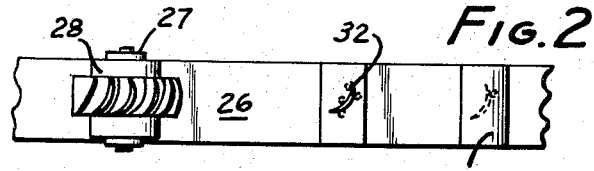
Figure 3:
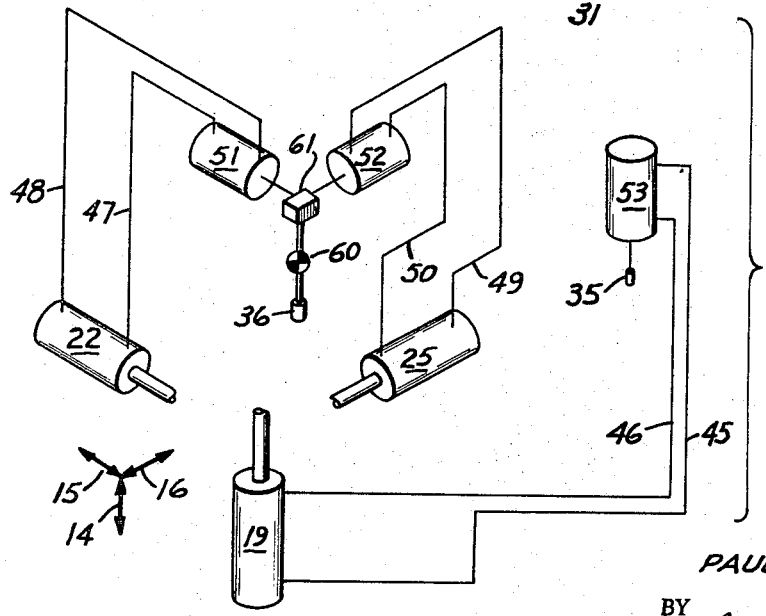

The above and other features of this invention will be fully understood from the following detailed description and the accompanying drawings in which:

FIG. 1 is a perspective view, partly in schematic notation, showing the presently preferred embodiment of the invention;
FIG. 2 is a fragmentary plan view taken at line 2—2 of FIG. 1; and
FIG. 3 is a schematic illustration of the tracer system of FIG. 1.

FIG. 1 shows a machine tool 10, in the example a mill, having a frame 11 supported by a base 12. A rail 13 is provided for supporting certain elements yet to be described. The machine has first, second and third axes 14, 15, 16, respectively. In the example given, the first axis is perpendicular, the second axis is in-out, and the third axis is right-left. It will be understood that this orientation of axes is not a limitation on the generality of the invention, nor is the selection of a mill.

The machine tool includes a first slideway 17 and a first slide 18, which are so disposed and arranged as to be movable along the first axis. First motive means 19, comprising a piston-cylinder combination, acts as a motor to shift the first slide along the first slideway. A second slideway 20 and a second slide 21 are mounted to the first slide, the second slideway being formed on the first slide. The second slideway and second slide are so disposed and arranged that the second slide is shiftable along the second axis 15. Second motive means 22, also comprising a piston-cylinder motor, is disposed, arranged, and interconnected between the first and the second slide as to cause this motion. First slide constitutes familiar knee, while the second slide moves on the knee for in-out motion.

A third slideway 23 is formed on the second slide, and extends along the third axis. A third slide 24 is mounted to the third slideway for reciprocation along the third axis. Third motive means 25, also a piston-cylinder motor, is interposed between the second and third slides for causing this motion.

For convenience in disclosure, all of the motive means are shown as piston-cylinder motors. It will be understood that any other type of linear actuator or fluid motor may be used instead of piston-cylinder motors on any of the axes.

A worktable 26 is mounted to the third slide and is customarily provided with T-slots (not shown) for use in holding down elements to be moved therewith. One such element is a workholder 27 which may be a rotationally indexable shaft adapted to hold a workpiece 28 beneath a cutter 29. Cutter spindle 29 is mounted to a powered shaft 30 driven by a motor which is supported by rail 13. The spindle has an axis of rotation parallel to the first axis, and drives a cutting tool such as a milling cutter.

Likewise, the worktable supports a first and a second template (or pattern) 31, 32, respectively. These are overhung by a first tracer valve 33 and a second tracer valve 34, respectively. These tracer valves have the familiar pencil-type stylus, for example styli 35, 36, respectively, which are adapted to make contact with the respective templates in order to establish flow conditions in the tracer valves themselves. The axis of control of the first tracer valve is the first axis. The axes of control of the second tracer valve are the second and third axes.

An illustration of the power and exhaust supply to the tracer valves is not necessary to the understanding of this invention and is eliminated for purposes of simplicity. Persons desiring further information on such supplies are referred to the aforesaid U.S. Patents Nos. 2,753,145 and 2,835,466. Suffice it to say that the tracer valves customarily include 4-way spool valves wherein a spool is shiftably contained in a sleeve. The sleeve and spool are suitably grooved and ported so that, at a neutral or null position, there is no flow through the valve. The valve includes a pressure port to which fluid is supplied under pressure, and an exhaust port from which fluid is exhausted.

When the spool is shifted one way or the other from null, one side of the motor is connected to the pressure port, and the other to the exhaust port. Reversal of the spool shift reverses the motor connection. A tracer valve serves to move the slides so as to return it to its null position.

The first tracer valve is of the single-axis type adapted to limit travel along the first axis. Drive means 40 is provided for the first tracer valve which comprises a tracer mount slideway 41 attached to rail 13, a tracer mount 42 is slidably engaged to slideway 41, the first tracer valve being attached to mount 42. The drive means further includes a screw 43 or other drive which is turned by motor 44 or a handle (not shown) so as to drive the first tracer valve along its axis.

Conduits 45, 46 connect the first tracer valve to first motive means 19. As shown in FIG. 3, the lines enter the cylinder on opposite sides of the piston so that differential pressure in either direction causes motion of the knee. Similarly, conduits 47, 48 are connected to the second motive means from one spool valve in the second tracer valve, and conduits 49, 50 connect the third motive means to another spool valve 52 in the second tracer valve.

The second tracer valve is preferably of the type which automatically traverses the periphery of a closed surface, either external or internal. An example of this type of tracer valve will be found in the aforesaid U.S. Patent No. 2,909,357, together with a complete description of four-way valves 51, 52, which form the second and third axis control means. Similarly, the function of valve 53, which is a simple linear motion-type, may be deduced from that patent, together with known principles of four-way spool valves. As to the second tracer valve, its stylus is pivoted at a point indicated by numeral 60 which is ordinarily a conventional ball and socket joint. A scotch yoke 61 joins the spools of valves 51 and 52 to the stylus so that components of motion in any direction of the universally mounted stylus are transmitted to the respective spool valves, the change in flow control characteristics of the spool valve being reflected in power supply to one or the other of the sides of the second and third axis cylinders.

The automatic feature of this invention is simply that of maintaining the tip of the stylus biased against the pattern and advanced along it so that it traverses along the pattern automatically. This is the same stylus deflection as would be accomplished manually.

Similarly, the function of the stylus in the first valve is to follow the surface of the first template.

It will be noted that the two templates exert a dual control over the shape of the workpiece, the first template determining the shape of the resulting surface in elevation, and the second tracer valve determining the surface in the plane formed by the second and third axes.

The operation of this device may be deduced from the foregoing and from the following detailed description of operation. It will be understood that the shape of the surface of the first template is that defined by the intended area which surrounds the root of the structure defined by the second template. For example, the device is hobbing a gear or turbine bucket wheel. The second template establishes the blade shape, and the first template establishes the shape of the region adjacent to the blade (the root), the root being shown as a pure cylinder in the example which would be a suitable conformation for such a structure.

When the machine tool is placed in operation, the stylus of the second tracer valve may either manually or automatically be caused to traverse around the second pattern as shown in FIG. 2. This will cause the stylus of the first tracer valve to move over the surface of the first template to create a path which is saddle-shape. Were the first tracer valve to be fixed on the tracer mount slideway, then only one pass would do all the cutting possible. For this reason, drive means 40 is provided which will gradually move the first tracer valve upwardly away from the pattern so that the worktable will follow upwardly, and the cutter will move downwardly into the workpiece. This may be done manually by turning a crank either continuously or periodically or by accomplishing the same function with motor 44. The device will therefore continue to traverse around the second pattern and move down in a modified sort of spiral toward the hub. This could continue indefinitely but for the fact that an adjustable stop 65 is provided which will arrest the upward movement of the first tracer valve at which time the motion will be determined solely by the shape of the first template. Then the desired conformation around the base of the blade will be formed.

It is evident that structures other than blades may be formed, and that it is not necessary to provide a rotational-type workpiece holder. This is simply one example of a use for the invention. When this type of workpiece is being manufactured, and the first blade is completed, then the workpiece is indexed and the procedure is repeated.

The illustrated machine is a conventional mill with a knee cylinder. However, this is only a single example of many different geometrical combinations of slides and slideways which can produce the same function. For example, some mills have a table which moves only on the second axis, this table being straddled by a bridge which moves along the first axis, and supports a slide which moves along the third axis. Still another has a worktable which moves only along the third axis, with an overhanging head that moves along the first and second axes.

These machines all have in common the fact that the worktable is supported by a slide which does not support another slide, and that the worktable and the tracer valve-spindle units can move relatively to each other along all three axes. Thus, the preferred device has all three slides in tandem arrangement, while the others separate the worktable from two of the slides. However, the same three-dimensional degrees of freedom between the cutter and workpiece, and between the tracer valves and the templates, exists in all embodiments.

This device provides an automatic three-dimensional tracer valve operation utilizing conventional components with the capability of producing configurations of considerable complexity. The axes are obliquely oriented, in this case mutually perpendicular. However, perpendicularity of axes is not a limitation on this invention.

This invention is not to be limited by the embodiments shown in the drawings and described in the description which are given by way of illustration and not of limitation, but only in accordance with the scope of the appended claims.

I claim:

1. A machine tool comprising: a frame having first, second and third axes which are mutually, obliquely oriented; first, second and third sets of slides and slideways supported by the frame so that each slide is reciprocable along a respective axis relative to the frame, at least one of said sets being mounted to another one of said sets whereby to be movable along two of said axes; first, second and third motive means adapted to move the first, second and third slides along their respective axes; one of said slides supporting another slide, a worktable supported by said last-mentioned slide adapted to hold a workpiece and a first and a second template; a cutter spindle and a first and a second tracer valve, the first axis, the cutter spindle, and the axis of control of the first tracer valve being parallel to each other, the second tracer valve controlling motion along the second and third axes, the cutter spindle and the tracer valves being mounted to the machine tool so that three-dimensional motion is possible between them and the worktable, the first tracer valve reacting with the first template, and the second tracer valve reacting with the second template; and drive means for moving said first tracer valve parallel to said first axis; whereby the tool may cut a single three-dimensional workpiece as a function of the shape of a pair of templates.

2. A machine tool according to claim 1 in which the said drive means comprises a tracer slideway extending along the first axis and mounted to the same structure as the cutter spindle, a tracer mount on the slide to which the said first tracer valve is mounted, and motive means for driving the tracer mount along the tracer slideway.

3. A machine tool according to claim 1 in which the second tracer valve is adapted automatically to trace a closed path in a plane defined by the second and third axes.

4. A machine tool according to claim 3 in which the said drive means comprises a tracer slideway extending along the first axis and mounted to the frame, a tracer mount on the slide, to which said first tracer valve is mounted, and motive means for driving the tracer mount along the tracer slideway.

5. A machine tool according to claim 1 in which the first motive means constitutes a vertically-oriented knee assembly, and in which the first slide includes a knee supported by the said knee assembly.

6. A machine tool according to claim 5 in which the said drive means comprises a tracer slideway extending along the first axis and mounted to the frame, a tracer mount on the slide, to which said first tracer valve is mounted, and motive means for driving the tracer mount along the tracer slideway.

7. A machine tool according to claim 6 in which the worktable includes a work support adapted to permit the workpiece to rotate around an axis which lies in the plane defined by the second and third axes.

8. A machine tool according to claim 1 in which the first, second and third sets of slideways are mounted one atop the other, the slideway of the first set being mounted on the frame and the third slide supporting the worktable.

No references cited.

WILLIAM W. DYER, JR., *Primary Examiner.*

G. A. DOST, *Assistant Examiner.*